(12) United States Patent
Khayrallah

(10) Patent No.: US 7,783,262 B2
(45) Date of Patent: Aug. 24, 2010

(54) METHOD FOR ADAPTIVE INTERLEAVING IN A WIRELESS COMMUNICATION SYSTEM WITH FEEDBACK

(75) Inventor: Ali S. Khayrallah, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/048,864

(22) Filed: Mar. 14, 2008

(65) Prior Publication Data

US 2008/0166977 A1    Jul. 10, 2008

Related U.S. Application Data

(63) Continuation of application No. 10/977,699, filed on Oct. 29, 2004, now abandoned.

(51) Int. Cl.
*H04B 7/00* (2006.01)

(52) U.S. Cl. .................. 455/69; 455/126; 455/102

(58) Field of Classification Search .............. 455/69, 455/126, 102
See application file for complete search history.

(56) References Cited

U.S. PATENT DOCUMENTS

| | | | |
|---|---|---|---|
| 5,673,291 A | | 9/1997 | Dent |
| 6,366,602 B1 * | | 4/2002 | Raitola ............ 375/135 |
| 7,103,325 B1 * | | 9/2006 | Jia et al. ............ 455/101 |
| 2001/0033621 A1 | | 10/2001 | Khayrallah |
| 2002/0126736 A1 | | 9/2002 | Khayrallah |
| 2004/0052315 A1 * | | 3/2004 | Thielecke et al. ...... 375/299 |
| 2006/0014542 A1 * | | 1/2006 | Khandekar et al. ..... 455/447 |
| 2006/0121946 A1 * | | 6/2006 | Walton et al. ............ 455/561 |
| 2008/0198760 A1 * | | 8/2008 | Stephens et al. ........ 370/252 |

FOREIGN PATENT DOCUMENTS

| | | |
|---|---|---|
| WO | WO 00/10280 | 2/2000 |
| WO | WO 2006/046127 A1 | 5/2006 |

OTHER PUBLICATIONS

A. Khayrallah and T. Fulghum, "Interleaver design and multi-pass demodulation," Proceedings Conference on Information Sciences and Systems, 2001.

A. Khayrallah, "Differential coding over bits for higher level modulation," Proceedings Conference on Information Sciences and Systems, 2002.

* cited by examiner

*Primary Examiner*—Barry W Taylor
(74) *Attorney, Agent, or Firm*—Roger S. Burleigh

(57) ABSTRACT

The present invention pertains to a transmitter that can exploit feedback to help it organize information which is subsequently sent to a receiver. More specifically, the transmitter receives a feedback signal from the receiver and then uses data about a channel in the feedback signal to adapt at least one of a coding, interleaving and modulating scheme to organize information which is subsequently transmitted to the receiver. In this way, the transmitter can obtain the best match of a channel and a given information payload.

17 Claims, 2 Drawing Sheets

METHOD FOR ADAPTIVE INTERLEAVING IN A WIRELESS COMMUNICATION SYSTEM WITH FEEDBACK

CROSS-REFERENCE TO RELATED APPLICATIONS

This application is a continuation of U.S. application Ser. No. 10/977,699, filed Oct. 29, 2004, now abandoned, the disclosure of which is incorporated herein by reference.

BACKGROUND OF THE INVENTION

1. Field of the Invention

The present invention relates in general to the wireless communication field and, in particular, to a transmitter that can exploit feedback about a state of a channel to help it organize information which is subsequently transmitted to a receiver.

2. Description of Related Art

The use of coding, interleaving and modulation is prevalent in both current and proposed wireless communication systems. Also, the current and proposed wireless communication systems can have different forms of radio access including Time Division Multiple Access (TDMA) with or without frequency hopping, Code Division Multiple Access (CDMA), Orthogonal Frequency Division Multiplexing (OFDM), Multi-Carrier CDMA (MC-CDMA), etc. In addition, the current and proposed wireless communication systems enable many different forms of feedback signaling, ranging from power control commands to complete channel state information. These main ingredients can be combined in different ways within the current and proposed wireless communication systems. To help describe how these main ingredients can be combined within traditional wireless communication systems, reference is made to FIG. 1.

FIG. 1 (PRIOR ART) is a block diagram showing the basic components of a traditional wireless communication system 100 that includes a single-antenna transmitter 102 (only one shown) and a single-antenna receiver 104 (only one shown). One skilled in the art will appreciate that it is relatively straightforward to extend this diagram and the description below to take into account multiple-antenna transmitters and/or multiple-antenna receivers. As shown, the transmitter 102 has a coder 106, an interleaver 108 and a modulator 110 that work together to transmit a radio signal 112 which passes through a channel and is received by the receiver 104. The received radio signal 112 is made up of many components, including the desired signal, own cell interference, other cell interference, adjacent carrier interference, and internal receiver noise. In baseband, the received radio signal 112 can be written as:

$$r_n = C * s_n + i_{n+wn},$$

where $s_n$ refers to the desired signal information symbols, $C=[C_0, \ldots, C_{M-1}]$ is a vector of M channel taps representing the state of the channel, * indicates a filter, or convolution, operation, $i_n$ refers to one or more co-channel and adjacent channel interference signals that the receiver 104 treats explicitly (for instance by whitening or joint detection), and $w_n$ refers to all other noise.

The format of the desired signal $s_n$ may be TDMA, CDMA, OFDM, MC-CDMA, etc. . . . First consider the case of TDMA. On each slot, assume that the receiver 104 computes an estimate of the signal-to-noise-ratio (SNR). The SNR is presumed to account for the particular capabilities of the receiver 104. That is, if the receiver 104 suppresses co-channel or adjacent channel interference, then that is reflected in the SNR. In a non-frequency hopped TDMA system, the slot SNR's reflect the time evolution of the desired signal channel, interference, etc. . . . And, in a frequency hopped TDMA system, the SNR's reflect the frequency selectivity of the channel, and the different interference level on each hop. Next consider the case of OFDM and MC-CDMA, where it is assumed that the receiver 104 computes an SNR for each carrier. These SNRs reflect the frequency selectivity of the channel, and the different interference level on each carrier. In all of these cases associated with TDMA, CDMA, OFDM, MC-CDMA, etc. . . . , the receiver 104 sends the SNR information in a feedback signal 114 to the transmitter 102.

Unfortunately, the traditional transmitter 102 does not use the SNR information in the feedback signal 114 to help organize the information it subsequently transmits in a radio signal 116 to the receiver 104. Instead, the transmitter 102 uses a randomizing strategy or some other strategy to send the information in radio signal 116 to the receiver 104. A more detailed discussion is provided next about some of the different ways the transmitter 102 can use a randomizing strategy or some other strategy to send the information in radio signal 116 to the receiver 104.

First, assume the transmitter 102 protects the information by using a random error correcting code. The random error correcting code can include convolutional codes, turbo codes, binary block codes or low density parity check codes (for example). Also, assume that the transmitter 102 uses trellis coded and block coded modulation schemes. These coding and modulation schemes are designed, and work best for the transmitter 102 in a non-fading environment where the presence of a noise process is independent from bit to bit (or symbol to symbol). However, in a fading environment for these methods to work well, the transmitter 102 typically resorts to a randomizing strategy which uses some form of interleaving to try and re-create a favorable scenario that takes advantage of diversity to transmit the information in radio signal 116 to the receiver 104. The term diversity is used herein to cover the variation in the desired signal's channel conditions, as well as the level of interference and its channel conditions, which are all seen from the vantage point of the receiver 104.

For instance, in a non-frequency hopping TDMA system, the transmitter 102 interleaves the bits from a codeword over multiple slots and within each slot to benefit from time diversity. In a frequency hopping TDMA system, the transmitter 102 interleaves the bits from a codeword over multiple hops, to benefit from frequency diversity. This is typically done in addition to time diversity. For a more detailed discussion about the relationship between coding and hopping reference is made to U.S. Patent Application Serial No. 2002/0126736 entitled "Methods and Systems for Selective Frequency Hopping in Multiple Mode Communication Systems".

Similarly, in an OFDM or MC-CDMA system, the transmitter 102 interleaves the bits from a codeword over multiple carriers. Thus, the guiding principle of a randomizing strategy that uses interleaving is to subject each codeword to a diversity of channel conditions, some of which are favorable, to give the receiver 104 a good chance of decoding that codeword successfully.

Now assume the transmitter 102 protects the information by using a burst error correcting code. The burst error correcting code includes binary codes such as Fire codes, and non-binary codes such as Reed-Solomon codes. In this situation, the strategy is essentially the opposite of randomizing. That is, for the case of a binary code, the transmitter 102 places neighboring bits on the same modulation symbol, and on the same slot or on the same tone. That way, if conditions at the receiver 104 are bad on a certain modulation symbol or slot or tone, a burst error may occur, which a decoder located therein is well suited to handle. Similarly, for the case of a non-binary code, the bits representing a non-binary code symbol (which may or may be the same size as a modulation symbol) are placed on the same modulation symbol, and on the same slot or on the same tone. As can be seen, the transmitter 102 and the burst error correcting code scheme described in this example do not use the SNR information in the feedback signal 114 to help organize the information it subsequently transmits in radio signal 116 to the receiver 104.

Now assume the transmitter 102 protects the information by using error control coding which is found in differential modulation and coding schemes. Typically, differential modulation is used for reasons other than coding. But, in here differential modulation is viewed from the coding perspective. For instance, consider the IS-136 standard, which uses Differential Quadrature Phase Shift Keying (DQPSK). In this case, the transmitter 102 while in speech mode protects certain information bits by coding while other information bits remain uncoded.

It has been found that the performance of DQPSK can be enhanced with the use of multi-pass demodulation. This enhancement performance is described in U.S. Pat. No. 5,673,291. Basically, the patent describes an idea where re-encoded DQPSK symbols corresponding to protected bits are used as effective pilots, to help demodulate the received neighboring symbols.

The multi-pass demodulation scheme itself can also be improved upon as described in an article by A. Khayrallah et al. entitled "Interleaver Design and Multi-Pass Demodulation," Proceedings Conference on Information Sciences and Systems, 2001. Using the scheme described in this article, one can provide large performance gains when the original interleaver is replaced with one designed specifically to take advantage of the interplay between multi-pass demodulation and the differential properties of DQPSK.

It has also been found where it is useful to separate the differential aspect from the modulation itself. That is, one can use standard coherent modulation such as Phase Shift Keying (PSK) or Quadrature Amplitude Modulation (QAM) and then impose differential relations among the bits before mapping them into modulation symbols. An advantage of this is associated with the added flexibility one has to design various differential relations among the bits. Moreover, it has been shown in the following two documents that such differential schemes can provide large gains in conjunction with multi-pass demodulation. One document is U.S. Patent Application No. 2001/0033621 and the other document is an article by A. Khayrallah entitled "Differential Coding over Bits for Higher Level Modulation," Proceedings Conference on Information Sciences and Systems, 2002. The contents of both of these documents are incorporated by reference herein. In these schemes, the basic idea is that re-encoded bits can act as effective pilots, boosting the performance of neighboring bits that are connected to them by a differential relation. As can be seen, the transmitter 102 and the differential modulation and coding schemes described in this example do not use the SNR information in the feedback signal 114 to help organize the information it subsequently transmits in radio signal 116 to the receiver 104.

Lei et al. "Performance Analysis of Adaptive Interleaving for OFDM Systems", IEEE Transactions on Vehicular Technology, Vol. 51, No. 3, May 2003 is an article that discloses a transmitter which uses an adaptive interleaving technique that rearranges symbols according to instantaneous channel state information (CSI) of OFDM subcarriers so as to reduce or minimize the bit error rate (BER) of each OFDM frame transmitted to a receiver. The receiver estimates the CSI for transmitted frames and then feedbacks the CSI to the transmitter. The transmitter uses the CSI to predict future CSIs and then determines the most efficient adaptive interleaving pattern. The receiver would estimate the same future CSIs and determine an identical interleaving pattern for de-interleaving.

US 2002/016938 A1 (Thomas J. Starr et al.) Feb. 7, 2002 discloses a method and system for automatically controlling an adaptive interleaver which involves monitoring performance parameters (SNR, BER . . . ) of a transmission system and then controlling the adaptive interleaver in response to the monitored performance parameters. In one embodiment, there is a transmission system 180 which comprises an adaptive interleaver 20, a transmitter 30, a transmission channel 35, a receiver/decoder 40 and a controller 80. The controller 80 comprises a signal to noise ratio monitor 72 which monitors the SNR on transmission channel 35 and generates a multiple bit adaptive interleave control signal 74 that preferably varies as a function of the SNR. Alternatively, the adaptive interleave control signal 74 can be binary such that the adaptive interleave control signal produced is greater than or less than a threshold value based upon the SNR. The controller 80 is coupled with to the adaptive interleaver 20 such that the adaptive interleave control signal 74 is supplied directly to the adaptive interleaver 20. The adaptive interleave control signal 74 is preferably utilized by the adaptive interleaver 20 to control the interleave depth to generate an adaptively interleaved signal.

Fengye Hu et al. "An Adaptive Interleaving Scheme for MIMO-OFDM Systems", Emerging Technologies: Frontiers of Mobile and Wireless Communication, May 31-Jun. 2, 2004 is an article that discloses an adaptive interleaving scheme for MIMO-OFDM systems. To perform this adaptive interleaving scheme, the receiver needs to estimate the channel state information (CSI) of received OFDM signals. Then, the receiver and transmitter need to use an identical predictive filter and have the same copy of CSI sequence so they both can use an identical interleaving/de-interleaving pattern.

US 2002/176482 A1 (Charles Chien et al.) Nov. 28, 2002 discloses a radio transceiver module (including a control processor) interfaced with a channel monitor which monitors a communication channel and estimates its characteristics from time to time, thus providing a dynamic estimate of channel characteristics. Based on the channel characteristics, the control processor calculates a preferred configuration of digital (and optionally, analog) signal processing to best manage the available energy for the present channel characteristics. The selected configuration is then down-loaded into communication modules stored in extra memory during runtime. The communication modules preferably include a one or more of: a reconfigurable forward error correcting codec (with adjustable code lengths and a plurality of code choices); a reconfigurable interleaver with adjustable depth; a decision feedback equalizer (DFE) with a reconfigurable number of taps; a maximum likelihood sequence estimator with an adjustable number of states; a frequency hopping coder with an adjustable number of hops or hop rate; and a direct-sequence (or direct sequence spread spectrum) codec with an adjustable number of chips per bit.

From the foregoing, it should be noticed that there is a need for a transmitter to use information in a feedback signal to help configure/select a randomizing strategy or some other strategy like differential modulation and coding to organize and send information in radio signal to receiver. The exploitation of information within a feedback signal, to help a transmitter better organize the information that is transmitted in a radio signal to a receiver is addressed by the present invention.

BRIEF SUMMARY OF THE INVENTION

The present invention pertains to a wireless communication system which has a transmitter that can exploit feedback to help it organize information which is subsequently sent to a receiver. More specifically, the transmitter implements one of the schemes of the present invention so it can exploit feedback about the state of a channel in determining how to organize information which is then sent to the receiver. Several different schemes are described herein to help explain how the transmitter can organize information to exploit the known channel conditions. For instance, the schemes can use random error correcting codes, burst error correcting codes or differential modulation/coding schemes. An aim of the present invention is to enable a transmitter to obtain the best match of a channel and a given information payload. The present invention is well suited for fixed rate applications, such as speech coders and streaming media applications. In addition, the present invention does not preclude the use of other control mechanisms, such as varying the rate or the power, which can be considered as an outer control in addition to the schemes of the present invention.

The typical scenario described herein is one where a terminal (receiver) sends feedback information about the downlink to a base station (transmitter) on an uplink channel. This can happen in applications such as streaming and web browsing where the data traffic on the downlink is higher than on the uplink. The uplink is likely to have the excess capacity to handle the traffic generated by the feedback. There are other scenarios where the traffic is balanced or higher on the uplink. This includes e-mail and office applications. In such cases, it would be beneficial for the base station to send feedback to the terminal.

The present invention is directed to a transmitter (communication system, method) that can perform the following steps: (1) receiving a feedback signal from a receiver (where the feedback signal contains an identifier of a chosen interleaving scheme which was selected by the receiver based on a condition of a channel between the transmitter and said receiver); (2) accessing a list of pre-defined interleaving schemes to determine which one of the pre-defined interleaving schemes corresponds with the identifier of the chosen interleaving scheme located in the feedback signal; and (3) implementing the one pre-defined interleaving scheme to adaptively interleave information which is subsequently transmitted in a radio signal to the receiver

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
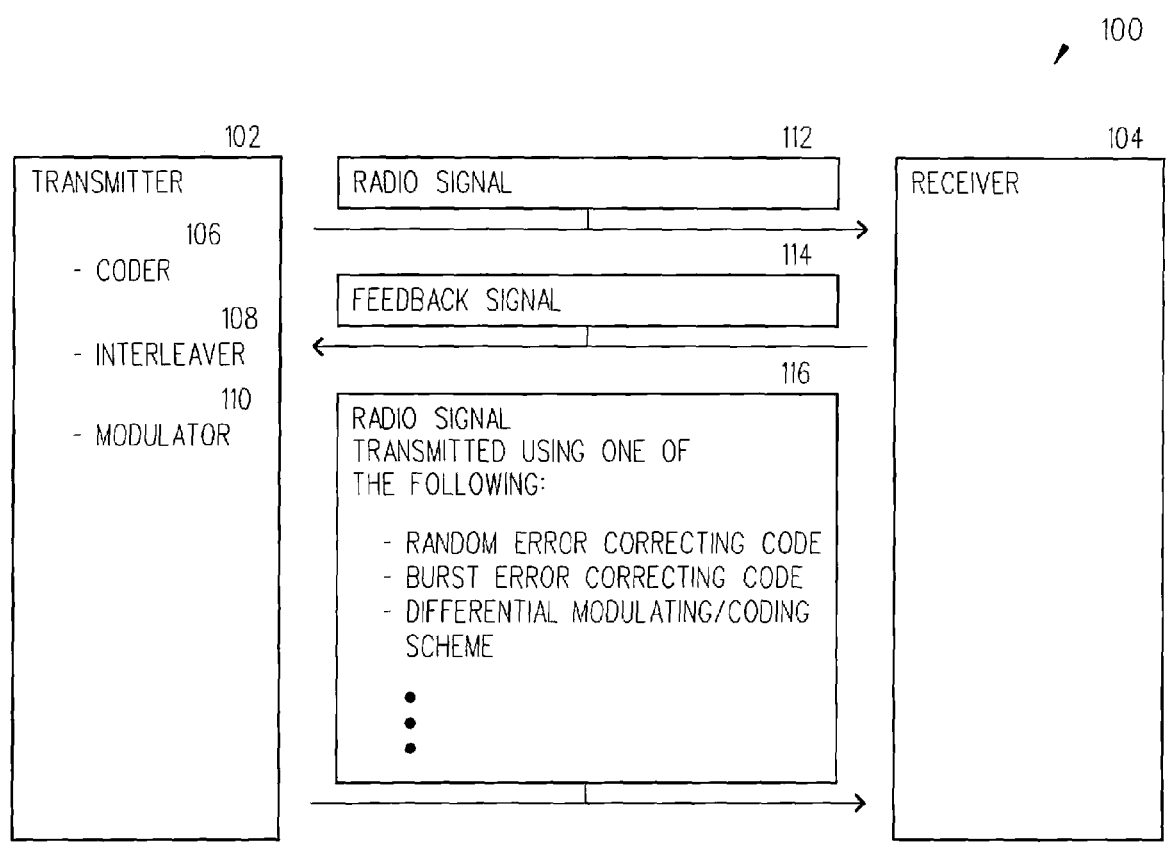
FIG. 1 (PRIOR ART) is a block diagram of a wireless communication system that includes a transmitter which does not exploit information in a feedback signal when it organizes and sends information in a radio signal to a receiver.
Figure 2:
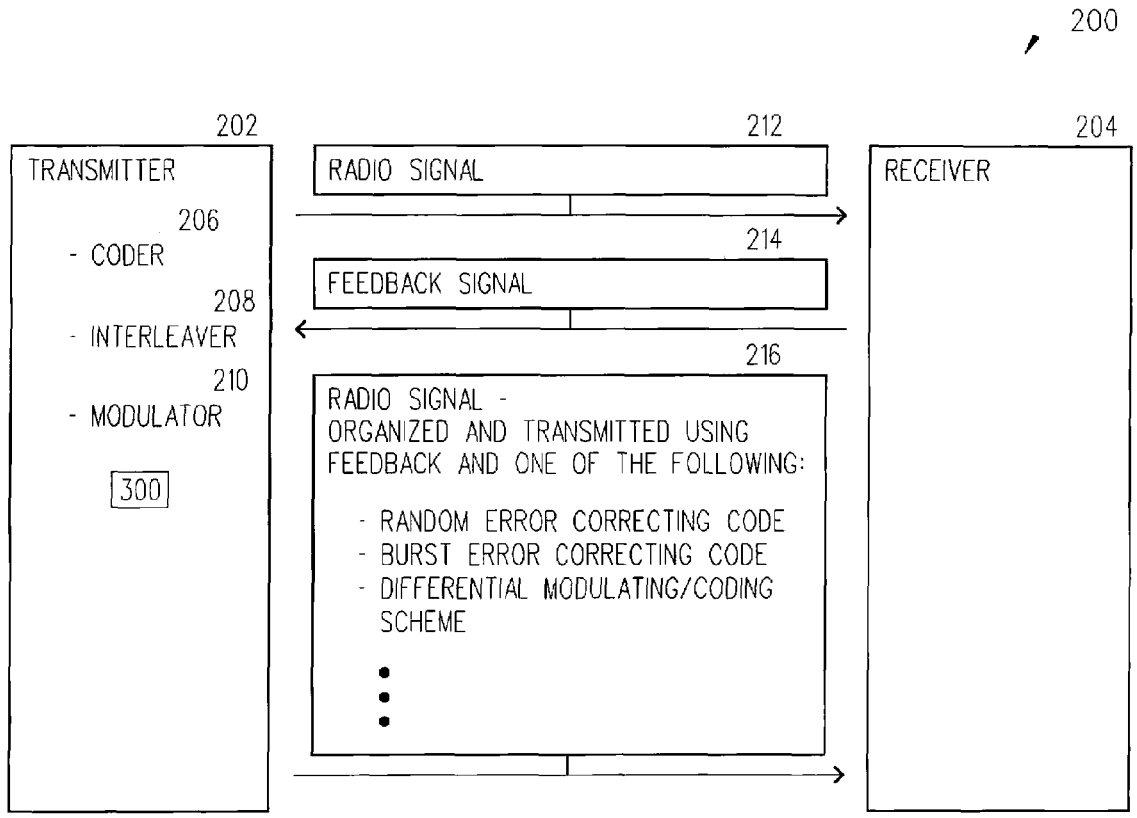
FIG. 2 is a block diagram of a wireless communication system that includes a transmitter which does exploit information in a feedback signal when it organizes and sends information in a radio signal to a receiver in accordance with the present invention.

Referring to FIG. 2, there is a block diagram of a wireless communication system 200 that includes a single-antenna transmitter 202 (only one shown) and a single-antenna receiver 204 (only one shown) which are both configured in accordance with the present invention. As shown, the transmitter 202 which can be implemented in a base station (not shown) has a coder 206, an interleaver 208 and a modulator 210 that work together to transmit a radio signal 212 which passes through a channel and is received by the receiver 204 (e.g., mobile phone 204). The received radio signal 212 is made up of many components, including the desired signal, own cell interference, other cell interference, adjacent carrier interference, and internal receiver noise. In baseband, the received radio signal 212 can be written as:

$$r_n = C * s_n + i_n + w_n,$$

where $s_n$ refers to the desired signal information symbols, $c=[C_0, \ldots, C_{M-1}]$ is a vector of M channel taps representing the state of the channel, * indicates a filter, or convolution, operation, $i_n$ refers to one or more co-channel and adjacent channel interference signals that the receiver 104 treats explicitly (for instance by whitening or joint detection), and $w_n$ refers to all other noise. The format of the desired signal $s_n$ may be TDMA, CDMA, OFDM, MC-CDMA, etc. . . .

The receiver 204 then in a similar manner as described in the Background Section analyzes the received radio signal 212 and sends a feedback signal 214 to the transmitter 202. The feedback signal 214 contains information about channel conditions like SNRs. Following is a detailed description about some different ways the transmitter 202 can use the knowledge about channel conditions in the feedback signal 214 to complement a randomizing strategy or another strategy (e.g., differential modulation and coding schemes) and organize information that is subsequently transmitted in radio signal 216 to the receiver 204.

Consider the case of OFDM or MC-CDMA. Suppose there are L carriers, and that the receiver 204 in determining the feedback signal 214 computes a vector of L SNRs, denoted as follows:

$$\sigma = [\sigma_1, \ldots, \sigma_L]$$

Because, the transmitter 202 has knowledge of σ, it can use this knowledge to organize information in order to best match the capabilities of its coding, interleaving, and modulation scheme. As stated earlier, the present invention focuses on how to organize a given payload, rather than varying the rate or the power. Those schemes can be considered in addition to the schemes of the present invention.

Suppose that the information associated with radio signal 216 is protected with a random error correcting code. Recall that in the prior art, the traditional transmitter 102 used a random-like interleaving scheme to disperse each codeword's bits over the symbols on the various tones. Instead, in the present invention, the transmitter 202 can use the accurate and timely information σ in the feedback signal 214 and a random-like interleaving scheme to position the codeword's bits accordingly. For example, suppose the values $\sigma_i$ are sorted from smallest to largest, with indices $i_1$ to $i_L$. As a result, a bit sent on a high index tone will be received reliably, while a bit sent on a low index tone will be received unreliably. The transmitter 202 can now interleave a codeword's bit to explicitly exploit this knowledge. For instance, the transmitter 202 can place the first bit at Tone $i_1$, the second bit at Tone $i_L$, the third bit at Tone $i_2$, the fourth bit at Tone $i_{L-1}$, etc, alternating good and bad tones to create a balanced placement that bests suits a random error correction code. If the code length is greater than L, then the interleaving pattern can repeat after L bits. Since the transmitter 202 and the receiver 204 both know σ, they can infer the same interleaving pattern, and function properly. It should be noted that the code's properties determine its ability to exploit diversity. This means that there is a number L' beyond which exposing the codeword bits to more tones does not help the performance of the decoder within the receiver 204. As such, if L' is smaller than L, then the transmitter 202 can choose L' to define the interleaver scheme instead of L.

In the aforementioned scheme, a balance between pushing as many code bits as possible over the channel and avoiding wasting energy can also be achieved by skipping the worst carriers. That is, given the code, it is possible to determine off-line by analysis or experimentation the SNR threshold below which it becomes detrimental to send code bits or symbols. In other words, in a list of carriers sorted by decreasing SNR, the end of the list that falls below the threshold would be eliminated from the resource pool. And, the remaining carriers would be made available for transmitting the radio signal 216.

Now suppose that the information associated with radio signal 216 is protected with a burst error correcting code. This includes binary codes such as Fire codes, and non-binary codes such as Reed-Solomon codes. In this case, the transmitter 202 intentionally places neighboring bits in a single tone, or in a cluster of bad tones. For instance, if 16QAM is used, the transmitter 202 could place the first 4 bits at Tone $i_1$, the next 4 bits at Tone $i_2$, and so on.

Now suppose that the information associated with radio signal 216 is protected with differential modulation and coding schemes. In this case, it is possible for the transmitter 202 to choose the specific differential relations to suit the state of the channel indicated by the feedback signal 214. In particular, it is possible for the transmitter 202 to help a few very bad tones a lot, or many bad tones each a little bit. To illustrate this feature, two exemplary schemes are described below where the input bits before the differential encoding are denoted as x, and the output bits after the differential encoding are denoted as y. Bits x may be the output of an error control encoder 206 in the transmitter 202. And, bits y feed the modulator 210. The actual modulation may be binary or QAM, PSK etc. . . .

Exemplary Scheme 1

Consider a situation where every other tone is bad. In particular, tone 1 is bad and tone 2 is good. The bits $x_1$ that map in Tone 1 are left unchanged, and the bits $x_2$ that map onto Tone 2 are encoded as follows:

$$y_1 = x_1$$

$$y_2 = x_2 + y_1$$

where the input bits $x_1$ and $x_2$ can be the outputs of a common error control encoder, or separate encoders in the transmitter 202.

At the receiver 204, the soft values are obtained for $y_1$ and $y_2$ from a demodulator (not shown). The soft values are then fed into a Maximum a Posteriori (MAP) decoder (not shown) which corresponds to the above differential equations. A detailed description about a MAP decoder is provided in the aforementioned article by A. Khayrallah entitled "Differential Coding over Bits for Higher Level Modulation".

The MAP decoder's output is then fed to a common error control decoder, or separate decoders in the receiver 204. The soft decisions from the decoder(s) are fed back to a differential decoder as side information in a second or subsequent pass. As a result, the performance of the information on tone 1 is improved. It should be appreciated that many components and details associated with the transmitter 202 and the receiver 204 described above are well known in the industry. Therefore, for clarity, the description provided herein omits those well known components and details that are not necessary to understand the present invention.

Exemplary Scheme 2

Consider a situation where every other third tone is bad. In particular, tone 1 is bad and tones 2 and 3 are good. In this example, the bits $x_1$ that map in Tone 1 are left unchanged, and the bits $x_2$ and $x_3$ that are respectively mapped onto tones 2 and 3 are encoded as follows:

$$y_1 = x_1$$

$$y_2 = x_2 + y_1$$

$$y_3 = x_3 + y_1$$

where bits $x_1$, $x_2$ and $x_3$ are the outputs of a common error control encoder, or separate encoders in the transmitter 202.

At the receiver 204, the soft values are obtained for $y_1$, $y_2$ and $y_3$ from a demodulator (not shown). These soft values are then fed into a MAP decoder (not shown) which corresponds to the above differential equations. The MAP decoder's output is then fed to a common error control decoder, or separate decoders in the receiver 204. The soft decisions from the decoder(s) are fed back to a differential decoder as side information in a second or subsequent pass. As a result, the performance of the information on tone 1 is improved more than in the previous scheme, due to the simultaneous relation with 2 bits. This scheme can be extended to larger sets of equations.

Now consider the case of TDMA. Suppose that a codeword is interleaved over L slots, and that the receiver 204 computes their corresponding SNR vector σ. Without frequency hopping, the SNRs reflect primarily the varying interference level. With frequency hopping, the SNRs also reflect frequency selectivity. The strategies described above with respect to OFDM and MC-CDMA can also be used to suit this type of code.

Figure 3:
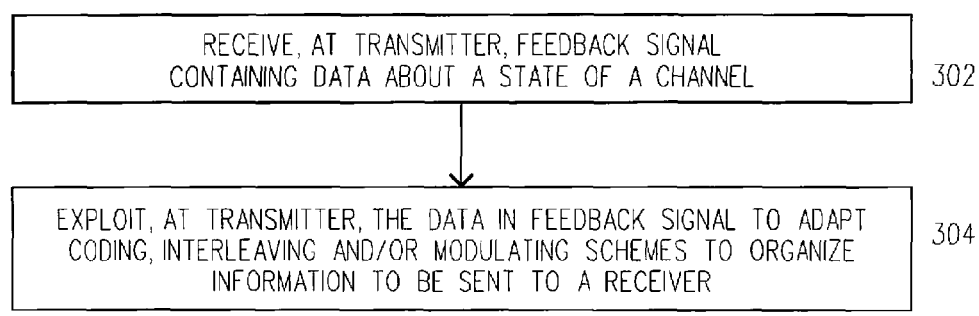
FIG. 3 is a flowchart that shows the steps of a preferred method for enabling a transmitter to exploit feedback about a state of a channel in choosing how to organize information that is to be sent to a receiver in accordance with the present invention.

From the foregoing, it should also be readily appreciated by those skilled in the art that the present invention includes a method 300 that can exploit feedback about a state of a channel in choosing how to organize information in a transmitter 202 with coding, interleaving and/or modulation schemes. The basic steps of the method 300 are shown in FIG. 3. Beginning at step 302, the transmitter 202 receives the feedback signal 214 from the receiver 204. As described above, the feedback signal 214 contains data about a state of a channel between the transmitter 202 and the receiver 204. And at step 304, the transmitter 202 exploits the data in the feedback signal 214 to adapt at least one of the coding, interleaving and/or modulating schemes to organize information that is subsequently transmitted within the radio signal 216 to the receiver 204. Several different examples on how this can be accomplished have been described above.

While particular embodiments of the invention have been described, it should be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the scope of the present invention. Several of these modifications or extensions to the present invention are described next.

Previously, it was assumed that the feedback signal 214 contained a vector of SNRs. This information is typically quantized. The quantization may be memoryless, or if the SNRs change slowly relative to the rate of feedback, the quantization may have memory, such as in Differential Pulse Code Modulation (DPCM) and sigma-delta quantization. Typically, the receiver 204 makes its interleaving decisions based on the quantized information, to match with the transmitter 202. Coarser quantization enables a leaner feedback, at the expense of more approximate matching.

However, in case the SNR information itself is not needed for other purposes at the transmitter 202, it is possible to convey the interleaving information directly in the feedback signal 214. For instance, if the number L of tones or slots is small, it is possible for the transmitter 202 and receiver 204 to keep a list of pre-defined interleavers that attempt to suit different SNR scenarios approximately. Then, the feedback signal 214 would include the index of the chosen interleaver. In addition, other feedback reducing mechanisms can be implemented by the present invention. For instance, in scenarios with slow varying SNR, the receiver 204 can invoke and transmit a feedback signal 214 only when the interleaver needs to be changed.

It should also be noted that information other than SNRs may be fed back to the transmitter 202 for other reasons, and may be exploited for our purposes. For instance, actual channel tap estimates may be fed back to the transmitter 204, which can be used to condition the transmitted signal 216 accordingly. The taps may be represented in the time or frequency domain, and either can be easily manipulated to suit the needs of the present invention. Also, estimates of the noise level on each tone or each slot may be fed back to the transmitter 204.

In another extension of the present invention, a multiple antenna receiver 204 can be used. This includes the case where a transmitter 202 transmits a single signal or stream from a single antenna, or from multiple antennas acting as a beam-former, or from multiple antennas acting as a transmit diversity system, e.g. Alamouti code or delay diversity. At the multiple antenna receiver 204, the SNR can be computed per tone or per slot after combining the multiple antenna signals. Then, the rest follows as described above.

In yet another extension of the present invention, a multiple antenna transmitter 202 can be used, that could transmit multiple streams of information. And, the receiver 204 would compute an SNR vector per stream where each SNR vector may be different because each stream may be transmitted differently. In this case, multiple SNR vectors are fed back to the multiple antenna transmitter 204 which then organizes each stream's codewords in accordance with the schemes of the present invention.

Although multiple embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the scope of the invention as set forth and defined by the following claims.

What is claimed is:

1. A transmitter that receives a feedback signal from a receiver for adaptively interleaving information sent in a wireless communications network, said transmitter operative to:
   obtain an identifier of a chosen interleaving scheme from said feedback signal, wherein said receiver selects the identifier of the chosen interleaving scheme based on a condition of a channel between said transmitter and said receiver;
   access a list of pre-defined interleaving schemes stored therein to determine which one of the pre-defined interleaving schemes corresponds with the identifier of the chosen interleaving scheme located in said feedback signal; and,
   instruct an interleaver to implement said one pre-defined interleaving scheme to adaptively interleave information which is subsequently transmitted in a radio signal to said receiver.

2. The transmitter of claim 1, wherein said interleaver implements said one pre-defined interleaving scheme which includes using a random error correction code to adaptively interleave the information which is subsequently transmitted in the radio signal to the receiver.

3. The transmitter of claim 1, wherein said interleaver implements said one pre-defined interleaving scheme which includes using a burst error correction code to adaptively interleave the information which is subsequently transmitted in the radio signal to the receiver.

4. The transmitter of claim 1, wherein Time Division Multiple Access with frequency hopping is used when sending the information in the radio signal to the receiver.

5. The transmitter of claim 1, wherein Time Division Multiple Access without frequency hopping is used to send the information in the radio signal to the receiver.

6. The transmitter of claim 1, wherein Code Division Multiple Access is used to send the in the radio signal to the receiver.

7. The transmitter of claim 1, wherein Orthogonal Frequency Division Multiplexing is used to send the in the radio signal to the receiver.

8. The transmitter of claim 1, wherein Multi-Carrier Code Division Multiple Access is used to send the information in the radio signal to the receiver.

9. A method implemented by a transmitter for adaptively interleaving information sent in a wireless communications network, said method comprising the steps of:
   receiving a feedback signal from a receiver, wherein the feedback signal contains an identifier of a chosen interleaving scheme which was selected by said receiver based on a condition of a channel between said transmitter and said receiver;
   accessing a list of pre-defined interleaving schemes to determine which one of the pre-defined interleaving schemes corresponds with the identifier of the chosen interleaving scheme located in said feedback signal; and,
   implementing said one pre-defined interleaving scheme to adaptively interleave information which is subsequently transmitted in a radio signal to said receiver.

10. The method of claim 9, wherein said transmitter implements said one pre-defined interleaving scheme which includes using a random error correction code to position codeword bits associated with the information that is subsequently transmitted in the radio signal to the receiver.

11. The method of claim 9, wherein said transmitter implements said one pre-defined interleaving scheme which includes using a burst error correction code to position codeword bits associated with the information that is subsequently transmitted in the radio signal to the receiver.

12. A communication system, comprising:
- a transmitter capable of transmitting a first radio signal;
- a receiver capable of receiving the radio signal and further capable of processing the radio signal and transmitting a feedback signal;
- wherein said transmitter is capable of receiving the feedback signal and is further operative to:
- obtain an identifier of a chosen interleaving scheme from said feedback signal, wherein said receiver selects the identifier of the chosen interleaving scheme based on a condition of a channel between said transmitter and said receiver;
- access a list of pre-defined interleaving schemes stored therein to determine which one of the pre-defined interleaving schemes corresponds with the identifier of the chosen interleaving scheme located in said feedback signal; and,
- instruct an interleaver to implement said one pre-defined interleaving scheme to adaptively interleave information which is subsequently transmitted in a second radio signal to said receiver.

13. The communication system of claim 12, wherein said transmitter implements said one pre-defined interleaving scheme which includes using a random error correction code to position codeword bits associated with the information that is subsequently transmitted in the second radio signal to said receiver.

14. The communication system of claim 12, wherein said transmitter implements said one pre-defined interleaving scheme which includes using a burst error correction code to position codeword bits associated with the information that is subsequently transmitted in the second radio signal to said receiver.

15. The communication system of claim 12, wherein said receiver transmits the feedback signal only when the interleaving scheme needs to be changed at said transmitter.

16. The communication system of claim 12, wherein said receiver is a multiple antenna receiver.

17. The communication system of claim 12, wherein said transmitter is a multiple antenna transmitter.

* * * * *

UNITED STATES PATENT AND TRADEMARK OFFICE
CERTIFICATE OF CORRECTION

Page 1 of 1

PATENT NO. : 7,783,262 B2
APPLICATION NO. : 12/048864
DATED : August 24, 2010
INVENTOR(S) : Khayrallah It is certified that error appears in the above-identified patent and that said Letters Patent is hereby corrected as shown below:

In Column 6, Line 26, delete "c=" and insert -- C= --, therefor.

In Column 10, Line 41, in Claim 6, after "send the", insert -- information --.

In Column 10, Line 44, in Claim 7, after "send the", insert -- information --.

Signed and Sealed this
First Day of February, 2011

David J. Kappos
*Director of the United States Patent and Trademark Office*